United States Patent
Mitsui et al.

(10) Patent No.: US 6,430,033 B1
(45) Date of Patent: Aug. 6, 2002

(54) SOLID ELECTROLYTIC CAPACITOR AND METHOD OF MAKING SAME

(75) Inventors: Kouichi Mitsui; Fumio Katayama, both of Ohtsu; Takashi Mizuguchi; Motohiro Yoshimi, both of Shiga-ken, all of (JP)

(73) Assignee: Nichicon Corporation, Kyoto (JP)

( * ) Notice: Subject to any disclaimer, the term of this patent is extended or adjusted under 35 U.S.C. 154(b) by 0 days.

(21) Appl. No.: 09/446,366

(22) PCT Filed: Jun. 24, 1999

(86) PCT No.: PCT/JP99/03423

§ 371 (c)(1),
(2), (4) Date: Dec. 20, 1999

(87) PCT Pub. No.: WO99/67797

PCT Pub. Date: Dec. 29, 1999

(30) Foreign Application Priority Data

| Jun. 25, 1998 | (JP) | 10-179410 |
| Aug. 19, 1998 | (JP) | 10-233240 |
| Oct. 26, 1998 | (JP) | 10-304216 |
| Oct. 26, 1998 | (JP) | 10-304217 |

(51) Int. Cl.[7] ............. H01G 9/02; H01G 9/00
(52) U.S. Cl. ............ 361/525; 361/524; 29/25.03; 252/62.2
(58) Field of Search ............... 361/523–541; 252/62.2; 29/25.03

(56) References Cited

U.S. PATENT DOCUMENTS

| 5,428,500 A | * | 6/1995 | Nishiyama et al. ......... 361/525 |
| 5,461,537 A | * | 10/1995 | Kobayashi et al. ......... 361/525 |
| 5,473,503 A | * | 12/1995 | Sakata et al. ............... 361/525 |
| 5,812,367 A | * | 9/1998 | Kudoh et al. ............... 361/523 |
| 6,151,205 A | * | 11/2000 | Kobayashi et al. ......... 361/523 |
| 6,154,358 A | * | 11/2000 | Fukaumi et al. ............ 361/523 |
| 6,206,937 B1 | * | 3/2001 | Kudoh et al. ............. 29/25.03 |

FOREIGN PATENT DOCUMENTS

| EP | 0 825 626 A2 | 2/1998 |
| JP | HEI 3-35516 | 2/1991 |
| JP | HEI 4-48710 | 2/1992 |
| JP | HEI 9-320900 | 12/1997 |

OTHER PUBLICATIONS

Japanese Patent Office (IPEA/JP), International Preliminary Examination Report, Oct. 5, 2000.

* cited by examiner

*Primary Examiner*—Dean A. Reichard
*Assistant Examiner*—Eric W Thomas
(74) *Attorney, Agent, or Firm*—Duane Morris LLP (57) ABSTRACT

A solid electrolytic capacitor includes an oxide dielectric layer, a first electrically conductive polymer layer of polymer of thiophene or its derivative, a second electrically conductive polymer layer of pyrrole, aniline, or derivative thereof formed by chemical polymerization, a third electrically conductive polymer layer of thiophene or its derivative formed by chemical polymerization, a fourth electrically conductive polymer layer of thiophene, pyrrole, aniline, or derivative thereof formed by electrolytic polymerization, and a fifth electrically conductive polymer layer of thiophene, pyrrole, aniline, or derivative thereof formed by chemical polymerization, which layers are sequentially disposed on a surface of a valve metal, and a carbon layer and a silver layer disposed on the fifth layer.

40 Claims, 2 Drawing Sheets

SOLID ELECTROLYTIC CAPACITOR AND METHOD OF MAKING SAME

TECHNICAL FIELD OF THE INVENTION

This invention relates to a solid electrolytic capacitor and a method of making it and, more particularly, to a solid electrolytic capacitor and a method of making such capacitor in which an electrically conductive polymeric compound is employed as the solid electrolytic material.

BACKGROUND OF THE INVENTION

In general, a solid electrolytic capacitor includes a dielectric oxide film disposed on a surface of a valve metal, one or more layers of solid electrolyte disposed on the dielectric oxide film, and a carbon layer and a silver layer disposed on the solid electrolytic layers. An anode lead is connected to the porous anode body, while a cathode lead is connected to the silver layer. After that, an outer coating of resin material is provided over the outer surface.

Known electrically conductive polymeric materials useable as a solid electrolyte of the solid electrolytic capacitor include polyacetylene, polypyrrole, polyaniline, polythiophene and poly-para-phenylene. In particular, polypyrrole, polyaniline and polythiophene are more frequently used because they have good conductivity and good thermal stability.

Japanese Unexamined Patent Publication (KOKAI) No. HEI 4-48710, for example, discloses a solid electrolytic capacitor having a solid electrolyte including two layers of electrically conductive polymer, which are formed by first disposing, on a dielectric oxide film, an electrically conductive polymer layer of polypyrrole by chemical polymerization, and, then, disposing, on the polypyrrole layer, another conductive polymer layer of polypyrrole by electrolytic polymerization. It is, however, difficult to form a uniform polypyrrole layer by chemical polymerization, and a polypyrrole layer can hardly be disposed on minute structures, such as recesses in a sintered body and etching pits. Thus, resulting products disadvantageously exhibit low capacitance and high impedance.

No. HEI 3-35516 shows solid electrolytic capacitors having a solid electrolyte including a film of polyaniline formed by applying a solution of pre-polymerized polyaniline over a surface of a dielectric film and drying it. Since the polyaniline solution has a high viscosity, it hardly enters into recesses in a sintered body formed of minute powder particles of tantalum or recesses in an oxide film on an aluminum foil. Accordingly, this method can produce capacitors disadvantageously having very small capacitance. It may be possible to form polyaniline by polymerizing aniline monomer on the oxide film. Capacitors produced by this method would satisfy the requirements on capacitance, but, because the conductivity of polyaniline itself is lower than polypyrrole, the impedance characteristic of the resulting capacitors exhibited in a high frequency region is not so good as capacitors with a polypyrrole layer.

In order to solve the above-described problems, Japanese Unexamined Patent Publication (KOKAI) No. HEI 9-320900 discloses a capacitor with a solid electrolyte of polyethylenedioxythiophene (hereinafter referred to as PEDT), which can be more easily formed into a uniform layer than polypyrrole and polyaniline. While PEDT can be easily formed into a uniform layer, a resulting layer is so thin that it is necessary to repeat a polymerizing process several tens of times in order to obtain a solid electrolyte extending to an outer periphery of a capacitor, which makes the manufacturing process very troublesome. If the number of the times of repetition of polymerization process is reduced, leakage current from the resulting capacitor is too large to provide desired characteristics.

In order to solve the above-discussed various problems, a solid electrolyte including a composite layer of conductive polymers may be used. In such a case, an outermost conductive polymer layer, which is to contact a carbon layer, is, in many cases, a layer formed by electrolytic polymerization. Although a conductive polymer layer formed by electrolytic polymerization can be thick and durable, its surface is flat and, therefore, it exhibits a low mechanical and electrical bonding strength with respect to the carbon layer. Thus, resulting capacitors have disadvantages in their mechanical strength, contact resistance between the conductive polymer layer and the carbon layer, and impedance characteristics in a high frequency region.

Objects of the Invention

A first object of the present invention is to realize a solid electrolytic capacitor having an anode electrode including a sinter of minute powder of a valve metal, which has large capacitance, exhibits good impedance characteristics in high frequency regions, and has a durable, electrically conductive composite polymer layer forming a solid electrolyte layer.

A second object of the present invention is to realize a solid electrolytic capacitor which exhibits high bonding strength between a composite, conductive polymer layer and a carbon layer formed thereon.

Means to Achieve the Objects

A solid electrolytic capacitor according to the present invention includes a composite, electrically conductive polymeric material layer structure including at least three layers disposed on a dielectric oxide film, which, in turn, is disposed on a surface of an anode body of a valve metal, e.g. tantalum. A first layer contacting the dielectric oxide film is formed of polythiophene or its derivative.

A second layer is an electrically conductive polymer layer formed by chemically polymerizing a material different from that of the first layer. As occasion demands, a third layer of polythiophene or its derivative may be disposed on the second layer. A fourth layer of electrically conductive polymer is formed by electrolytic polymerization on the third layer or on the second layer in the absence of the third layer.

Polythiophene or its derivative forming the first layer has advantages that it has good electrical conductivity, can be made to enter into the interiors of minute pores in the sintered anode body when an appropriate processing is employed, and can uniformly coat the surface of the dielectric oxide film. However, it has a disadvantage that the layer formed thereof is thin.

Polypyrrole, polyaniline or a derivative thereof is suitable as the electrically conductive polymer material for the second layer. When it is disposed to overlie the first layer by chemical polymerization, the second conductive polymer layer can be relatively thick and can be intimately bonded to the first conductive polymer layer. The second layer, together with the first layer, and also with the later-mentioned third layer, provides a durable, electrically conductive polymer multi-layered structure.

An electrically conductive polymer layer of polythiophene or its derivative, which provides the third layer, when disposed on the second conductive polymer layer, can provide the resulting multi-layered structure with higher electric conductivity and fineness.

The fourth conductive polymer layer is formed on the second or third layer by electrolytic polymerization so that it can provide sufficient durability and thickness for the composite electrolytic layer-structure of the solid electrolytic capacitor. The above-described conductive polymer multi-layered structure can couple current required for the electrolytic polymerization uniformly to the polymeric material forming the fourth layer.

Thus, since the composite, electrolytic polymer layer structure of the above-described solid electrolytic capacitor can extend into minute pores in the sintered anode body to cover the entire surface of the dielectric oxide layer, it can provide the resulting solid electrolytic capacitor with large capacitance and good impedance characteristic. Furthermore, it can be thick and have good mechanical and thermal strength. A carbon layer is disposed on the composite, conductive polymer layer structure.

According to the present invention, a fifth electrically conductive polymer layer may be additionally formed between the fourth layer and the carbon layer by chemical polymerization. For the fifth layer, polythiophene, polypyrrole, polyaniline or a derivative thereof is a suitable material. The electric conductivity of the fifth layer can be increased by mixing into it, from 1 to 50% by weight of powder of carbon and/or the conductive polymer material same as that of the fifth layer.

Since the fifth layer provides improved bonding between the composite conductive polymer layer and the carbon layer, it contributes to the reduction of the internal resistance component of the capacitor element to thereby improve the impedance characteristic of the capacitor and also increase the mechanical strength of the capacitor.

A suitable thiophene derivative for the conductive polymer layer(s) may be a thiophene derivative which has at least one member selected from a hydrogen group, an acetyl group, a carboxyl group, an alkyl group and an alkoxyl group, as a substituent group, in the 3-position, the 3- and 4-positions or the S-position of the thiophene skeleton, or it may be 3,4-alkylenedioxythiophene.

For the second, conductive polymer layer, pyrrole or its derivative, or aniline or its derivative may be suitable. A suitable pyrrole derivative may have at least one member selected from the group of hydroxyl, acetyl, carboxyl, alkyl and alkoxyl groups as a substituent group at the 3-position, the 3- and 4-positions or the N-position of the pyrrole skeleton. A suitable aniline derivative useable for the second layer may have the aniline skeleton and has at least one member selected from the group of alkyl, phenyl, alkoxyl, ester and thioether groups as a substituent group.

The first, second, third and fifth chemical polymerization layers may be formed by, for example, a "three-solution process", a "two-solution process" or a "one-solution process". The three-solution process is a process in which a capacitor element is immersed successively in a monomer solution, a dopant solution and an oxidizing agent solution, and, then, polymerization is caused to take place at a predetermined temperature. The two-solution process is a process in which a capacitor element is immersed in a monomer solution and, thereafter, in a mixture solution of a dopant and an oxidizing agent, or the element is immersed in a mixture solution of a monomer and a dopant and, then, in a mixture solution of a monomer and an oxidizing agent, before the polymerization is caused to take place at a predetermined temperature. The one-solution process is a process in which a capacitor element is immersed in a mixture solution of a monomer, a dopant and an oxidizing agent or in a mixture solution of a monomer and a dopant having oxidizing ability before polymerization is caused to take place at a predetermined temperature. Whichever process is employed, the remaining oxidizing agent must be removed after the polymerization by rinsing the element in water. The film-forming polymerization process may be repeated plural times to produce a layer of a desired thickness.

As for the first and third layers, a polymer layer may be formed by immersing a capacitor element in a solution of polymer of thiophene, its derivative or an intermediate polymer thereof, and, then, heating the assembly.

There is no special requirement for the dopant which can be used in the present invention, but, for providing solid electrolytic capacitors with good characteristics, a sulfonic acid compound may be preferably used. For example, the following may be used: 1,5-naphthalenedisulfonic acid, 1,6-naphthalenedisulfonic acid, 1-octanesulfonic acid, 1-naphthalenesulfonic acid, 2-naphthalenesulfonic acid, 2,6-naphthalenedisulfonic acid, 2,7-naphthalenedisulfonic acid, 2-methyl-5-isopropylbenzenesulfonic acid, 4-octylbenzenesulfonic acid, 4-nitrotoluene-2-sulfonic acid, m-nitrobenzenesulfonic acid, n-octylsulfonic acid, n-butanesulfonic acid, n-hexanesulfonic acid, o-nitrobenzenesulfonic acid, p-ethylbenzenesulfonic acid, p-chlorobenzenesulfonic acid, p-dodecylbenzenesulfonic acid, p-toluenesulfonic acid, p-nitrobenzenesulfonic acid, p-pentylbenzenesulfonic acid, ethanesulfonic acid, camphorsulfonic acid, dinonyinaphthalenesulfonic acid, cetylsulfonic acid, dodecylsulfonic acid, trichlorobenzenesulfonic acid, trifluoromethanesulfonic acid, hydroxybenzenesulfonic acid, butyinaphthalenesulfonic acid, benzenesulfonic acid, polyvinylsulfonic acid and methanesulfonic acid. Also, their salts may be used, which include, for example, lithium salt, potassium salt, sodium salt, silver salt, copper salt, iron salt, aluminum salt, cerium salt, tungsten salt, chromium salt, manganese salt, tin salt, methyl ammonium salt, dimethyl ammonium salt, trimethyl ammonium salt, tetramethyl ammonium salt, ethyl ammonium salt, diethyl ammonium salt, triethyl ammonium salt, tetraethyl ammonium salt, ethyl methyl ammonium salt, diethyl methyl ammonium salt, dimethyl ethyl ammonium, triethyl methyl ammonium salt, trimethyl ethyl ammonium salt, diethyl dimethyl ammonium salt, propyl ammonium salt, dipropyl ammonium salt, isopropyl ammonium salt, di-isopropyl ammonium salt, butyl ammonium salt, dibutyl ammonium salt, methyl propyl ammonium salt, ethyl propyl ammonium salt, methyl isopropyl ammonium salt, ethyl isopropyl ammonium salt, methyl butyl ammonium salt, ethyl butyl ammonium salt, tetramethylol ammonium salt, tetra-n-butyl ammonium salt, tetra-sec-butyl ammonium salt, tetra-t-butyl ammonium salt, piperidinium salt, pyrrolidinium salt, piperazinium salt, pyridinium salt, α-picolinium salt, β-picolinium salt, γ-picolinium salt, quinolinium salt, isoquinolinium salt, pyrrolinium salt and ammonium salt.

DESCRIPTION OF EMBODIMENTS

Now, embodiments of the present invention are described with reference to the drawings. Throughout FIGS. 1–6, the same reference numerals denote portions having the same or similar functions.

Figure 1:
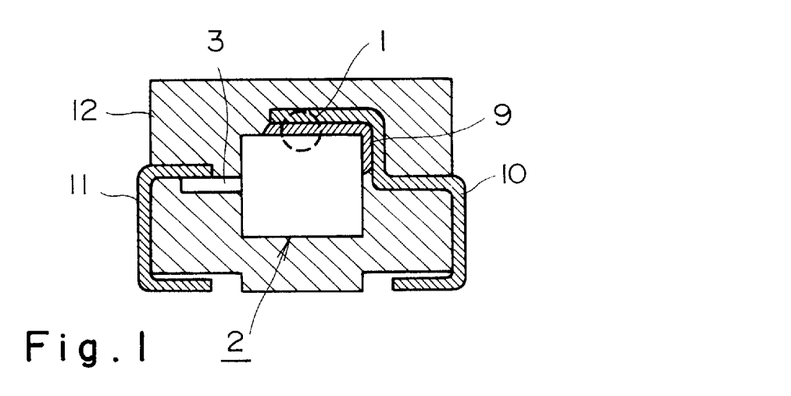
FIG. 1 is a cross-sectional view showing a structure of solid electrolytic capacitors in general.
Figure 2:
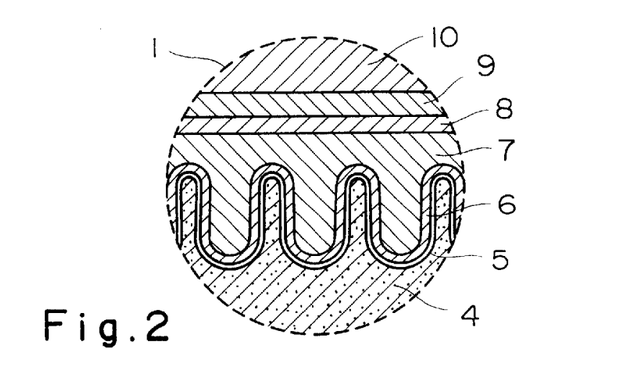
FIG. 2 is an enlarged, cross-sectional view of a portion in a broken-line circle shown in FIG. 1 of a prior art solid electrolytic capacitor.

FIG. 1 shows a structure common to a prior art solid electrolytic capacitor and a solid electrolytic capacitor according to the present invention, and FIG. 2 is an enlarged cross-sectional view of a portion in a broken-line circle 1 of a prior art solid electrolytic capacitor. An anode lead 3 extends from a capacitor element 2. As shown in FIG. 2, the capacitor element 2 includes a sinter 4 formed of minute particles of tantalum, an oxide dielectric layer 5 on a surface of the tantalum sinter 4, an electrically conductive polymer layer 6 acting as a solid electrolyte disposed on the dielectric oxide layer 5, a carbon layer 7 on the polymer layer 6, a silver layer 8 on the carbon layer 7, and a cathode terminal plate 10 bonded to the silver layer 8 by an electrically conductive adhesive 9. An anode terminal plate 11 is welded to the anode lead 3. The capacitor element 2 is encapsulated in a plastic encapsulation 12. The portions of the terminal plates 10 and 11 extending beyond the encapsulation 12 are bent to extend along the bottom surface of the encapsulation 12.

EMBODIMENT 1

Figures 3, 4:
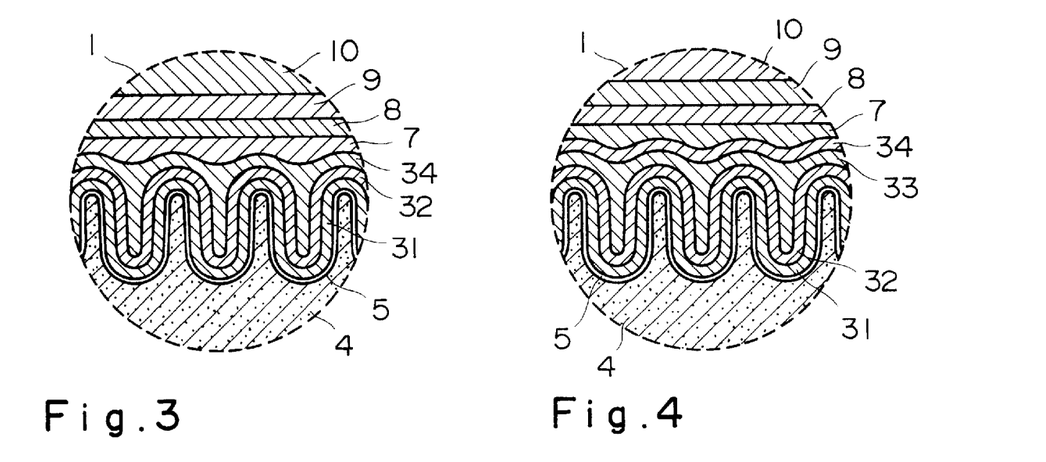
FIG. 3 is an enlarged, cross-sectional view of a portion in the broken-line circle in FIG. 1, of a solid electrolytic capacitor according to a first embodiment of the present invention, which includes three electrically conductive polymer layers acting together as a solid electrolyte.
FIG. 4 is an enlarged, cross-sectional view of a portion in the broken-line circle in FIG. 1, of a solid electrolytic capacitor according to another embodiment of the present invention, which includes four electrically conductive polymer layers acting together as a solid electrolyte.

A sinter 4 formed of minute particles of tantalum in a shape of quadratic prism having dimensions of 3.0 mm×4.0 mm×1.5 mm was anodized at 20 V in an 0.05 weight % aqueous solution of phosphoric acid. Then, the anodized sinter 4 was rinsed and dried, which resulted in an oxide dielectric layer 5 on the surface of the sinter 4 as shown in FIG. 3. An electrically conductive polymer layer 31 of polythiophene or its derivative was disposed on the oxide dielectric layer 5 on the sinter 4 by impregnation of the layer 5 with a polymer solution or chemical polymerization. Over the layer 31, an electrically conductive polymer layer 32 of polypyrrole, polyaniline or a derivative thereof was formed by chemical polymerization. On the layer 32, an electrically conductive polymer layer 34 of polythiophene, polypyrrole, polyaniline or a derivative thereof was formed by electrolytic polymerization with the layers 31 and 32 used as electrodes. A carbon layer 7 and a silver layer 8 were applied in a known manner over the layer 34. A cathode terminal plate 10 is bonded to the silver layer 8 with an electrically conductive adhesive agent 9, and an anode terminal plate 11 was welded to an anode lead 3. Then, a plastic encapsulation 12 was formed. This resulted in a solid capacitor having a voltage rating of 6.3 V and capacitance of 150 $\mu$F.

According to the Embodiment 1, a hundred (100) solid electrolytic capacitors of each of the following Examples 1 through 3 were made. Also, a hundred solid electrolytic capacitors having only the layers 31 and 34, but lacking the layer 32, were made for comparison with the capacitors of Examples 1 through 3.

Example 1

The conductive polymer layers 31, 32 and 34 were stacked in the following order.

Layer 31

A sinter was immersed in a solution containing:

| Monomer | |
|---|---|
| EDT (ethylenedioxythiophene) | 5 wt % |
| Oxidizing Agent and Dopant | |
| PTS-Fe(III) (iron (III) p-toluenesulufonate) | 25 wt % |
| Solvent | |
| NB (n-butanol) | 30 wt % |
| IP (i-propanol) | 37 wt % |
| Pure Water | 3 wt % |

Then, the sinter was removed out of the solution and heated at 50° C. for 60 minutes so as to cause polymerization. After that, the sinter was rinsed with pure water and dried at 100° C. for five minutes. This processing was carried out three times.

Layer 32

The sinter was immersed in a first solution containing:

| Monomer | |
|---|---|
| Pyrrole | 48 wt % |
| Solvent | |
| Ethanol | 32 wt % |
| Pure Water | 20 wt % |

Thereafter, the sinter was removed out of the solution and dried. Then, it was immersed in a second solution containing:

| Oxidizing Agent | |
|---|---|
| APS (ammonium peroxide) | 5 wt % |
| Dopant | |
| PTS (p-toluenesulfonic acid) | 3 wt % |
| Solvent | |
| Pure Water | 92 wt % |

The sinter was removed out of the second solution and heated to 50° C. for 10 minutes to cause polymerization, and, then, rinsed with pure water. After that, the sinter was dried at 100° C. for five minutes. This processing was carried out three times.

Layer 34

The sinter was immersed in a solution containing:

| Monomer | |
|---|---|
| Pyrrole | 0.3 mol/L |
| Dopant | |
| NS (sodium naphthalenesulfonate) | 0.1 mol/L |
| Solvent | |
| Pure Water | |

Current of 1 mA was made to flow for five hours, with the layers 31 and 32 used as electrodes. The structure was rinsed with pure water and dried at 100° C. for five minutes.

Example 2

Layer 31

A sinter was impregnated with Baytron-P (a product of Bayer AG) and was heated to 100° C. for 10 minutes to cause polymerization to occur. After that, the structure was rinsed with pure water and, then, dried at 100° C. for 5 minutes. This processing was carried out three times.

Layer 32

The layer 32 was formed in the same manner as the layer 32 of Example 1.

Layer 34

The layer 34 was formed in the same manner as the layer 34 of Example 1.

Example 3

Layer 31

The layer 31 was formed in the same manner as the layer 31 of Example 1.

Layer 32

The sinter was immersed in a solution containing:

| Monomer | |
|---|---|
| Pyrrole | 10 wt % |
| Oxidizing Agent and Dopant | |
| PTS-Fe (III) | 20 wt % |
| Solvent | |
| Ethanol | 60 wt % |
| Pure Water | 10 wt % |

Then, the sinter was removed out of the solution and heated at 50° C. for 10 minutes to cause polymerization. After that, the structure was rinsed with pure water and heated to dry at 100° C. for 5 minutes. This processing was carried out three times.

Layer 34

The layer 34 was formed in the same manner as the layer 34 of Example 1.

COMPARATIVE EXAMPLE 1

Comparative Example 1 lacked the layer 32 and included the layer 34 disposed directly on the layer 31.

Layer 31

The layer 31 was formed by carrying out four times the same immersing and polymerizing processing as employed for the layer 31 of Example 1.

Layer 32

No layer 32 was provided.

Layer 34

The layer 34 was formed in the same manner as the layer 34 of Example 1.

A hundred solid electrolytic capacitors with the composite conductive polymer layer structure according to each of Examples 1 through 3 and Comparative Example 1 were manufactured. They were subjected to a solder-heat resistance test (260° C., 10 seconds), and the ratio (%) of the capacitance of the respective capacitors before the test and the capacitance after the test, and the leakage currents ($\mu A$) and the impedances (m$\Omega$) before and after the test were measured. The result is shown in TABLE 1.

TABLE 1

| | | | Embodiment 1 | Example 1 | Example 2 | Example 3 | Comparative Example 1 |
|---|---|---|---|---|---|---|---|
| Solder-Heat Resistance Test Condition 260° C. 10 seconds | Capacitance Ratio (%) | Before Test | 100 | 100 | 100 | 100 | 100 |
| | | After Test | 99 | 99 | 99 | 99 | 95 |
| | Leakage Current ($\mu A$) | Before Test | 3.1 | 4.2 | 4.4 | 6.8 | |
| | | After Test | 3.2 | 4.2 | 4.5 | 9.2 | |
| | Impedance (m$\Omega$) | Before Test | 40 | 50 | 44 | 58 | |
| | | After Test | 45 | 52 | 47 | 66 | |

As is understood from TABLE 1, the capacitors according to Embodiment 1 of the present invention in which the chemically polymerized two-layered, electrically conductive polymer layer structure consists of the layers 31 and 32, are superior to the capacitors of Comparative Example 1, which have only the layer 31 as the conductive polymer layer, in leakage current and impedance characteristics. It is also known that the characteristics have been little degraded by the heat resistance test.

EMBODIMENT 2

As shown in FIG. 4, on the conductive polymer layers 31 and 32 formed by chemical polymerization, a layer 33 of polythiophene or polythiophene derivative was formed by chemical polymerization. On the layer 33, an electrically conductive polymer layer 34 was formed by electrolytic polymerization with the layers 31 and 32 and the layer 33 used as electrodes. The remainder of the capacitor structure was the same as the Embodiment 1

A hundred solid electrolytic capacitors having a composite, electrically conductive polymer layer structure of each of Examples 4 through 6 were fabricated according to the Embodiment 2. The remaining structural details are same as the Embodiment 1.

Example 4

The electrically conductive polymer layers 31, 32, 33 and 34 were formed, being stacked in the following order.

Layer 31

The layer 31 was formed in the same manner as the layer 31 of Example 1, except that the thermal polymerizing process was carried out four times.

Layer 32

The sinter was immersed in a first solution containing:

| Monomer | |
|---|---|
| Pyrrole | 48 wt % |
| Solvent | |
| Ethanol | 32 wt % |
| Pure Water | 20 wt % |

Then, the sinter was removed out of the first solution and dried. After that, the sinter was immersed in a second solution containing:

| Oxidizing Agent | |
|---|---|
| APS | 7 wt % |
| Dopant | |
| PTS | 2 wt % |
| Solvent | |
| Pure Water | 91 wt % |

After that, the sinter was heated at 50° C. for 10 minutes to cause polymerization to take place, and, then, rinsed with pure water and dried at 100° C. for five minutes. This processing was carried out twice.

Layer 33

The layer 33 was formed in the completely the same manner as the layer 31 of this Example.

Layer 34

The sinter was immersed in a mixture solution containing:

| Monomer | |
|---|---|
| Pyrrole | 2.0 mol/L |
| Dopant | |
| NS | 0.1 mo/L |
| Solvent | |
| Acetonitrile | |

Current of 1 mA was applied for five hours with the layers 31, 32 and 33 used as electrodes to cause electrolytic polymerization to take place. Then, the sinter was rinsed with pure water, and, thereafter, heated for drying at 100° C. for five minutes.

Example 5

Layer 31

A sinter was impregnated with Baytron-P and heated at 50° C. for 10 minutes to cause polymerization. After that, it was rinsed with pure water and heated for drying at 100° C. for five minutes.

Layer 32

The layer 32 was formed in the same manner as the layer 32 of Example 4.

Layer 33

The layer 33 was formed in completely the same manner as the layer 31 of this example.

Layer 34

The layer 34 was formed in the same manner as the layer 34 of Example 4.

Example 6

Layer 31

The layer 31 was formed in the same manner as the layer 31 of Example 4.

Layer 32

The same processing as used for the layer 32 of Example 3 was employed, except that the thermal polymerization was carried out twice.

Layer 33

The layer 33 was formed in the same manner as the layer 31 of the present Example.

Layer 34

The layer 34 was formed in the same manner as the layer 34 of Example 4.

For comparison with Examples 4, 5 and 6, a hundred solid electrolytic capacitors having a composite electrically conductive polymer layer structure of Example 1 were fabricated. They were subjected to a solder-heat resistance test (260° C., 10 seconds), and the ratio (%) between the capacitance before the test and the capacitance after the test, the leakage currents ($\mu$A) before and after the test, and the impedances (m$\Omega$) were measured. The results are shown in TABLE 2.

TABLE 2

| | | | Embodiment 2 | Example 4 | Example 5 | Example 6 | Example 1 |
|---|---|---|---|---|---|---|---|
| Solder-Heat | Capacitance | Before Test | 100 | 100 | 100 | 100 | |
| Resistance Test | Ratio (%) | After Test | 99 | 99 | 99 | 99 | |
| Condition | Leakage | Before Test | 3.0 | 4.0 | 4.0 | 3.1 | |
| 260° C. | Current ($\mu$A) | After Test | 3.0 | 4.0 | 4.0 | 3.2 | |
| 10 seconds | Impedance | Before Test | 30.5 | 32.5 | 31.5 | 40 | |
| | (m$\Omega$) | After Test | 31.0 | 33.0 | 32.0 | 45 | |

As is seen from TABLE 2, Examples 4, 5 and 6 having a composite electrically conductive polymer layer structure consisting of three layers 31, 32 and 33, which act as electrodes for the electrolytic polymerization of the layer 34, are superior in the impedance characteristic in particular, to Example 1 having a composite electrically conductive polymer layer structure consisting of the layers 31 and 32.

EMBODIMENT 3

Figure 5:
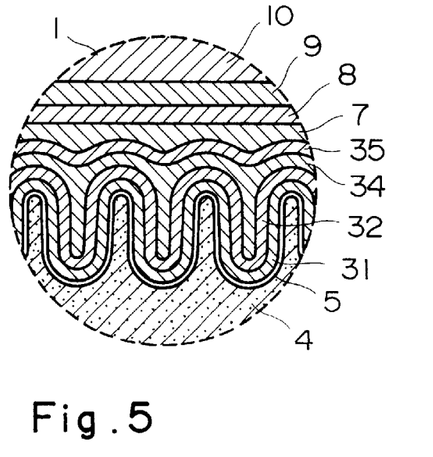
FIG. 5 is an enlarged, cross-sectional view of a portion in the broken-line circle in FIG. 1, of a solid electrolytic capacitor according to still another embodiment of the present invention, the outermost one of four electrically conductive polymer layers acting together as a solid electrolyte being formed by chemical polymerization.

As shown in FIG. 5, a layer 35 of polythiophene, polypyrrole, polyaniline, a derivative thereof is formed on the electrolytically polymerized layer 34 of FIG. 3 by chemical polymerization. The carbon layer 7 is disposed on the layer 35. The remainder of the structure is the same as Embodiment 1.

In order to verify the effect of the chemically polymerized layer 35 of Embodiment 3, a hundred capacitors each of Specimens 1, 2 and 3 and Comparative Example 2 were fabricated as in Embodiment 1Specimens 1, 2 and 3 had the structure shown in FIG. 5, lacking the conductive polymer layer 32, so that the electrolytically polymerized layer 34 was disposed directly on the chemically polymerized layer 31 and the chemically polymerized layer 35 was disposed on the layer 34. Comparative Example 2 was for comparison with Specimens 1, 2 and 3 and, for that purpose, did not include the chemically polymerized layer 35. The details of the respective electrically conductive polymer layers of Specimens 1, 2 and 3 and Comparative Example 2 were as follows.

SPECIMEN 1

Layer 31

The layer 31 was formed in the same manner as the layer 31 of Example 1.

COMPARATIVE EXAMPLE 2

Layer 31

The layer 31 was formed in the same manner as the layer 31 of Specimen 1.

Layer 34

The layer 34 was formed in the same manner as the layer 34 of Specimen 1.

A hundred solid electrolytic capacitors with the composite conductive polymer layer structure of each of Specimens 1, 2 and 3 and Comparative Example 2 were made, and their various characteristics before and after a solder-heat resistance test were measured. The results are shown in TABLE 3.

TABLE 3

| | Embodiment 3 | | Specimen 1 | Specimen 2 | Specimen 3 | Comparative Example 2 |
|---|---|---|---|---|---|---|
| Solder-Heat Resistance Test Condition 260° C. 10 seconds | Capacitance Ratio (%) | Before Test | 100 | 100 | 100 | 100 |
| | | After Test | 99 | 99 | 99 | 95 |
| | Leakage Current ($\mu$A) | Before Test | 3.1 | 4.2 | 4.2 | 6.5 |
| | | After Test | 3.2 | 4.2 | 4.5 | 6.5 |
| | Impedance (m$\Omega$) | Before Test | 45 | 52 | 85 | 58 |
| | | After Test | 46 | 53 | 100 | 66 |

Layer 34

The sinter was immersed in a mixture solution containing:

| | |
|---|---|
| Monomer | |
| Pyrrole | 0.3 mol/L |
| Dopant | |
| Tetraethylammonium p-toluenesulfonic acid | 0.1 mol/L |
| Solvent | |
| Acetonitrile | |

Current of 1 mA was supplied for five hours with the layer 31 used as an electrode, to thereby cause electrolytic polymerization. Thereafter, the structure was rinsed with pure water and, then, dried at 100° C. for five minutes.

Layer 35

The layer 35 was formed by the same method as employed for forming the layer 31 of Example 1, except that the polymerizing by heating was done twice.

SPECIMEN 2

Layer 31

The layer 31 was formed in the same manner as the layer 31 of Example 2.

Layer 34

The layer 34 was formed in the same manner as the layer 34 of Specimen 1.

Layer 35

The layer 35 was formed in the same manner as the layer 35 of Specimen 1.

SPECIMEN 3

Layer 31

The layer 31 was formed in the same manner as the layer 31 of Example 1.

Layer 34

The layer 34 was formed in the same manner as the layer 34 of Specimen 1.

Layer 35

The layer 35 was formed in the same manner as the layer 32 of Example 1.

As is seen from TABLE 3, in comparison with the capacitors of Comparative Example 2 lacking the chemical polymerization layer 35, the capacitors of Specimens 1, 2 and 3 have their capacitance decreased less by the heat resistance test. In particular, the capacitors of Specimens 1 and 2. which employ polymer of ethylenedioxythiophene for the chemical polymerization layer 35 have improved leakage current and impedance characteristics, too.

EMBODIMENT 4

Figure 6:
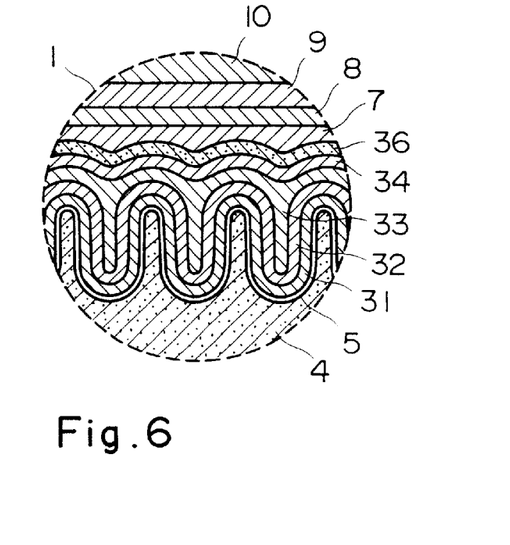
FIG. 6 is an enlarged, cross-sectional view of a portion in the broken-line circle in FIG. 1, of a solid electrolytic capacitor according to a further embodiment of the present invention, the outermost one of five electrically conductive polymer layers acting together as a solid electrolyte being an electrically conductive polymer layer containing electrically conductive particles and being formed by chemical polymerization.

As shown in FIG. 6, an electrically conductive polymer layer 36 with electrically conductive particles mixed therein is formed by chemical polymerization on the electrolytic polymerization layer 34 of FIG. 4, and the carbon layer 7 is disposed on the layer 36. The conductive polymeric compound of the chemical polymerization layer 36 is polythiophene, polypyrrole, polyaniline or derivative thereof, as that of the layer 35 of Embodiment 3, and the particles mixed therewith are carbon particles and/or particles of the conductive polymer compound of the layer 36. The remaining configuration is the same as Embodiment 1.

In order to verify the effects of the chemical polymerization layer 36 with conductive particles mixed therein, a hundred capacitors of each of Specimens 4, 5 and 6 were fabricated. Specimens 4, 5 and 6 had the structure shown in FIG. 6, which, however, lacked the conductive polymer layers 32 and 33, so that the electrolytic polymerization layer 34 was disposed directly on the chemical polymerization layer 31. The chemical polymerization layer 36 with conductive particles mixed therein was disposed on the layer 34. The details of the electrically conductive polymer layer structures of Specimens 4, 5 and 6 were as follows.

SPECIMEN 4

Layer 31

The layer 31 was formed in the same manner as the layer 31 of Example 1.

Layer 34

The layer 34 was formed in the same manner as the layer 34 of Specimen 1.

Layer 36

A solution having the same composition as the solution used in forming the layer 35 of Specimen 1 was used. Polyethylenedioxythiophene particles in an amount of 10 weight % of the solution were added to the solution. Using this solution, the layer 36 was formed in accordance with the method as used in forming the layer 35 of Specimen 1.

SPECIMEN 5

Layer 31

The layer 31 was formed in the same manner as the layer 31 of Example 1.

Layer 34

The layer 34 was formed in the same manner as the layer 34 of Specimen 1.

Layer 36

A solution having the same composition as the solution used in forming the layer 35 of Specimen 3 was used. Polypyrrole particles in an amount of 10 weight % of the solution were added. Using this solution, the layer 36 was formed in accordance with the method as used in forming the layer 35 of Specimen 3.

SPECIMEN 6

Layer 31

The layer 31 was formed in the same manner as the layer 31 of Example 1.

Layer 34

The layer 34 was formed in the same manner as the layer 34 of Specimen 1.

Layer 36

A solution having the same composition as the solution used in forming the layer 35 of Specimen 1 was used. Carbon particles in an amount of 10 weight % of the solution were added to the solution. Using this solution, the layer 36 was formed in accordance with the method as used in forming the layer 35 of Specimen 1.

A hundred solid electrolytic capacitors with the composite conductive polymer layer structure shown in each of Specimens 4, 5 and 6 were fabricated. Data obtained by measuring various characteristics before and after a solder-heat resistance test is shown in TABLE 4 together with data of Specimen 1 for comparison.

TABLE 4

| Embodiment 4 | | | Specimen 4 | Specimen 5 | Specimen 6 | Specimen 1 |
|---|---|---|---|---|---|---|
| Solder-Heat | Capacitance | Before Test | 100 | 100 | 100 | 100 |
| Resistance Test | Ratio (%) | After Test | 99 | 99 | 99 | 99 |
| Condition | Leakage | Before Test | 3.2 | 4.2 | 3.1 | 3.1 |
| 260° C. | Current ($\mu$A) | After Test | 3.3 | 4.2 | 3.2 | 3.2 |
| 10 seconds | Impedance | Before Test | 37 | 41 | 45 | 45 |
| | (m$\Omega$) | After Test | 37 | 42 | 46 | 46 |

As is seen from TABLE 4, it has been found that the respective specimens were improved in impedance characteristic, in particular, in comparison with the Comparative Examples in which no electrically conductive particles are used. Comparison of Specimen 6 with Specimen 3 shown in TABLE 3 has revealed that when polypyrrole is used for the chemical polymerization layer 35 or 36, the mixing of conductive particles with polypyrrole largely contributes to the reduction of impedance although polypyrrole alone contributes little to the reduction of impedance.

As described above, the present invention gives a large contribution to lessening the reduction of capacitance and leakage current caused by heat and improving the impedance characteristic of solid electrolytic capacitors.

The respective electrically conductive polymer layers of the respective embodiments can be formed by any one of the one-solution processing in which elements are immersed in a solution containing three constituents, namely, a monomer, an oxidizing agent and a dopant, the two-solution processing in which elements are successively immersed in a solution containing two constituents and a solution containing the remaining one constituent, and the three-solution processing in which elements are immersed sequentially in solutions containing different ones of the constituents. Also, a different combination of dopant and oxidizing agent may be used in combination for each immersing step.

What is claimed is:

1. A solid electrolytic capacitor comprising an oxide dielectric layer, a composite electrically conductive polymer layer structure comprising a plurality of electrically conductive polymer layers, a carbon layer and a silver layer which are sequentially disposed on a surface of an anode body formed of a valve metal, wherein said composite electrically conductive polymer layer structure comprises a first layer of polymer of thiophene or a derivative thereof contacting the oxide dielectric layer, a second layer of a material different from the material of the first layer, said second layer being formed on the first layer by chemical polymerization, and a third layer positioned between said second layer and said carbon layer and formed by electrolytic polymerization;

wherein a fourth electrically conductive polymer layer formed by chemical polymerization is interposed between and in contact with said third layer and said carbon layer.

2. A solid electrolytic capacitor comprising an oxide dielectric layer, a composite electrically conductive polymer layer structure comprising a plurality of electrically conductive polymer layers, a carbon layer and a silver layer which are sequentially disposed on a surface of an anode body formed of a valve metal, wherein said composite electrically conductive polymer layer structure comprises a first layer of polymer of thiophene or a derivative thereof contacting the oxide dielectric layer, a second layer of a material different from the material of the first layer, said second layer being formed on the first layer by chemical polymerization, and a third layer positioned between said second layer and said carbon layer and formed by electrolytic polymerization;

wherein a layer formed by chemical polymerization of thiophene or a derivative of thiophene is disposed between said second and third layers.

3. The solid electrolytic capacitor according to claim 1 or 2 wherein the second layer is an electrically conductive polymer layer formed by chemically polymerizing pyrrole, a derivative of pyrrole, aniline or a derivative of aniline.

4. The solid electrolytic capacitor according to claim 1 or 2 wherein said third layer is disposed on and in contact with said second layer.

5. The solid electrolytic capacitor according to claim 1 or 2 wherein said third layer is of a polymer of thiophene, a derivative of thiophene, pyrrole, a derivative of pyrrole, aniline or a derivative of aniline.

6. The solid electrolytic capacitor according to claim 1 wherein said fourth layer is formed of a polymer of thiophene, a derivative of thiophene, pyrrole a derivative of pyrrole, aniline or a derivative of aniline.

7. The solid electrolytic capacitor according to claim 6 or 2 wherein said thiophene derivative is a thiophene derivative having at least one member selected from a group consisting of hydroxyl, acetyl, carboxyl, alkyl and alkoxyl groups, as a substituent group at the 3-position, the 3- and 4-positions, or the S-position of the thiophene skeleton, or 3,4-alkylenedioxythiophene.

8. The solid electrolytic capacitor according to claim 6 wherein said pyrrole derivative has at least one member selected from a group consisting of hydroxyl, acetyl, carboxyl, alkyl and alkoxyl groups, as a substituent group at the 3-position, the 3- and 4-positions, or the N-position of the pyrrole skeleton.

9. The solid electrolytic capacitor according to claim 6 wherein said aniline derivative has the aniline skeleton and has at least one member selected from a group consisting of alkyl, phenyl, alkoxyl, ester and thioether groups as a substituent group.

10. The solid electrolytic capacitor according to claim 1 wherein said fourth layer contains from 1 to 50 weight % of electrically conductive particles.

11. The solid electrolytic capacitor according to claim 10 wherein said electrically conductive particles are carbon particles.

12. The solid electrolytic capacitor according to claim 10 wherein said electrically conductive particles are particles of the electrically conductive polymer material forming said fourth layer.

13. A method of making a solid electrolytic capacitor, comprising a step of forming a first electrically conductive polymer layer of polymer of thiophene or a derivative of thiophene on an oxide dielectric layer formed on a surface of an anode body of a valve metal, a step of forming a second electrically conductive polymer layer of a polymer of pyrrole, a derivative of pyrrole, aniline or a derivative of aniline by chemical polymerization on said first layer, and a step of forming a third electrically conductive polymer layer on said second layer by electrolytic polymerization, with said first and second layers used as electrodes, a step of forming a fourth electrically conductive polymer layer of a polymer of thiophene, a derivative of thiophene, pyrrole, a derivative of pyrrole, aniline or a derivative of aniline by chemical polymerization on said third layer, a step of forming a carbon layer on said fourth layer, and a step of forming a silver layer on said carbon layer.

14. A method of making a solid electrolytic capacitor, comprising a step of forming a first electrically conductive polymer layer of polymer of thiophene or a derivative of thiophene on an oxide dielectric layer formed on a surface of an anode body of a valve metal, a step of forming a second electrically conductive polymer layer of a polymer of pyrrole, a derivative of pyrrole, aniline or a derivative of aniline by chemical polymerization on said first layer, and a step of forming a third electrically conductive polymer layer on said second layer by electrolytic polymerization, with said first and second layers used as electrodes;
wherein an additional layer of chemically polymerized thiophene or a derivative of thiophene is disposed on said second layer, and said third layer is disposed on said additional layer.

15. The method of making a solid electrolytic capacitor according to claim 13 or 14 wherein said third layer is of a polymer of thiophene, a derivative of thiophene, pyrrole, a derivative of pyrrole, aniline or a derivative of aniline.

16. The method of making a solid electrolytic capacitor according to claim 13 or 14 further comprising a step of forming a carbon layer on said third layer, and a step of forming a silver layer on said carbon layer.

17. The method of making a solid electrolytic capacitor according to claim 13 or 14 wherein said first layer is formed by impregnating said anode body with a solution comprising a solvent containing water and thiophene or a derivative of thiophene in the form of polymer dissolved into said solvent, and heating said anode body.

18. The method of making a solid electrolytic capacitor according to claim 13 or 14 wherein said first layer is formed by impregnating said anode body with a mixture solution containing a monomer of thiophene or a derivative of thiophene, a dopant and an oxidizing agent, or with a mixture solution containing said monomer and a dopant having an oxidizing function, and causing chemical polymerization to take place.

19. The method of making a solid electrolytic capacitor according to claim 13 or 14 wherein said first layer is formed by impregnating said anode body with a monomer of thiophene or a derivative of thiophene, and, thereafter, with a mixture solution containing an oxidizing agent and a dopant or with a solution of a dopant having an oxidizing function, and causing chemical polymerization to take place.

20. The method of making a solid electrolytic capacitor according to claim 13 or 14 wherein said first layer is formed by impregnating said anode body with a mixture solution containing a monomer of thiophene or a derivative of thiophene and a dopant, and with a mixture solution containing said monomer and an oxidizing agent, and causing chemical polymerization to take place.

21. The method of making a solid electrolytic capacitor according to claim 13 or 14 wherein said first layer is formed by impregnating said anode body separately with a solution of a dopant, a solution of a monomer of thiophene or a derivative of thiophene, and a solution of an oxidizing agent, and causing chemical polymerization to take place.

22. The method of making a solid electrolytic capacitor according to claim 13 or 14 wherein said second layer is formed by impregnating said anode body having said first layer formed thereon, with a mixture solution containing a monomer of pyrrole, a derivative of pyrrole, aniline or a derivative of aniline, a dopant and an oxidizing agent, or with a mixture solution containing said monomer and a dopant having an oxidizing function, and causing chemical polymerization to take place.

23. The method of making a solid electrolytic capacitor according to claim 13 or 14 wherein said second layer is formed by impregnating said anode body having said first layer formed thereon, with a monomer of pyrrole, a derivative of pyrrole, aniline or a derivative of aniline and, thereafter, with a mixture solution containing an oxidizing agent and a dopant or a solution of a dopant having an oxidizing function to cause chemical polymerization to take place.

24. The method of making a solid electrolytic capacitor according to claims 13 or 14 wherein said second layer is formed by impregnating said anode body having said first layer formed thereon, with a mixture solution containing a monomer of pyrrole, a derivative of pyrrole, aniline or a derivative of aniline, and a dopant, and also with a mixture solution containing said monomer and an oxidizing agent, and causing chemical polymerization to take place.

25. The method of making a solid electrolytic capacitor according to claim 13 or 14 wherein said second layer is formed by impregnating said anode body having said first layer formed thereon, separately with a solution of a dopant, a solution of a monomer of thiophene, a derivative of thiophene, pyrrole, a derivative of pyrrole, aniline or a derivative of aniline, and a solution of an oxidizing agent, and causing chemical polymerization to take place.

26. The method of making a solid electrolytic capacitor according to claim 13 wherein said fourth layer is formed by impregnating said anode body having said first, second and third layers formed thereon, with a mixture solution containing a monomer of thiophene, a derivative of thiophene, pyrrole, a derivative of pyrrole, aniline or a derivative of aniline, a dopant and an oxidizing agent, or with a mixture solution containing said monomer and a dopant having an oxidizing function, and causing chemical polymerization to take place.

27. The method of making a solid electrolytic capacitor according to claim 13 wherein said fourth layer is formed by impregnating said anode body with a monomer of thiophene or a derivative of thiophene, and, thereafter, with a mixture solution containing an oxidizing agent and a dopant or with a solution of a dopant having an oxidizing function, and causing chemical polymerization to take place.

28. The method of making a solid electrolytic capacitor according to claim 13 wherein said fourth layer is formed by impregnating said anode body having said first, second and third layers formed thereon, with a mixture solution containing a monomer of thiophene, a derivative of thiophene, pyrrole, a derivative of pyrrole, aniline or a derivative of aniline and a dopant, and with a mixture solution containing said monomer and an oxidizing agent, and causing chemical polymerization to take place.

29. The method of making a solid electrolytic capacitor according to claim 13 wherein said fourth layer is formed by impregnating said anode body having said first, second and third layers separately with a solution of a monomer of thiophene, a derivative of thiophene, pyrrole, a derivative of pyrrole, aniline, or a derivative of aniline, a solution of a dopant, and a solution of an oxidizing agent, and causing chemical polymerization to take place.

30. The method of making a solid electrolytic capacitor according to claim 13 wherein said fourth layer contains from 1 to 50 weight % of electrically conductive particles.

31. The method of making a solid electrolytic capacitor according to claim 30 wherein said electrically conductive particles are carbon particles.

32. The method of making a solid electrolytic capacitor according to claim 30 wherein said electrically conductive particles are particles of a polymer compound forming said fourth electrically conductive polymer layer.

33. The method of making a solid electrolytic capacitor according to claim 13 or 14 wherein said thiophene derivative is a derivative having at least one member selected from a group consisting of hydroxyl, acetyl, carboxyl, alkyl and alkoxyl groups, as a substituent group, at the 3-position, the 3- and 4-positions, or the S-position of the thiophene skeleton, or 3,4-alkylenedioxythiophene.

34. The method of making a solid electrolytic capacitor according to claim 13 wherein said pyrrole derivative has at least one member selected from a group consisting of hydroxyl, acetyl, carboxyl, alkyl and alkoxyl groups, as a substituent group, at the 3-position, the 3- and 4-positions, or the N-position of the pyrrole skeleton.

35. The method of making a solid electrolytic capacitor according to claim 13 wherein said aniline derivative has the aniline skeleton and has at least one member selected from a group consisting of alkyl, phenyl, alkoxyl, ester and thioether groups as a substituent group.

36. The method of making a solid electrolytic capacitor according to claim 14 wherein said additional layer is formed by impregnating said anode body with a solution comprising a solvent containing water and thiophene or a derivative of thiophene in the form of polymer dissolved into said solvent, and heating said anode body.

37. The method of making a solid electrolytic capacitor according to claim 14 wherein said additional layer is formed by impregnating said anode body with a mixture solution containing a monomer of thiophene or a derivative of thiophene, a dopant and an oxidizing agent, or with a mixture solution containing said monomer and a dopant having an oxidizing function, and causing chemical polymerization to take place.

38. The method of making a solid electrolytic capacitor according to claim 14 wherein said additional layer is formed by impregnating said anode body with a monomer of thiophene or a derivative of thiophene, and, thereafter, with a mixture solution containing an oxidizing agent and a dopant or with a solution of a dopant having an oxidizing function, and causing chemical polymerization to take place.

39. The method of making a solid electrolytic capacitor according to claim 14 wherein said additional layer is formed by impregnating said anode body with a mixture solution containing a monomer of thiophene or a derivative of thiophene and a dopant, and with a mixture solution containing said monomer and an oxidizing agent, and causing chemical polymerization to take place.

40. The method of making a solid electrolytic capacitor according to claim 14 wherein said fifth layer is formed by impregnating said anode body separately with a solution of a dopant, a solution of a monomer of thiophene or a derivative of thiophene, and a solution of an oxidizing agent, and causing chemical polymerization to take place.

* * * * *